March 27, 1934.     D. S. BAKER     1,952,193
APPARATUS FOR HANDLING MATERIALS
Original Filed May 8, 1929     7 Sheets-Sheet 1

INVENTOR
David S. Baker
BY Robert W. Byerly
ATTORNEY

March 27, 1934. D. S. BAKER 1,952,193
APPARATUS FOR HANDLING MATERIALS
Original Filed May 8, 1929 7 Sheets-Sheet 2

Patented Mar. 27, 1934

1,952,193

UNITED STATES PATENT OFFICE 1,952,193

APPARATUS FOR HANDLING MATERIALS

David S. Baker, Greenwich, Conn.

Application May 8, 1929, Serial No. 361,383
Renewed August 11, 1933

29 Claims. (Cl. 198—154)

This invention relates to apparatus for handling materials, and aims to facilitate the movement, and more particularly the treatment, of materials.

The invention relates to apparatus of the type described and claimed in Baker Patent No. 1,672,404, in which a number of wheeled collapsible carriers, each provided with a number of carrying elements, are moved in a closed circuit in such manner as to place the carrying elements of each carrier in edge-to-edge relation at a loading station, in superimposed relation in a treatment space, and in a vertical position at a dumping station.

The present invention aims to improve, simplify and increase the capacity of such handling apparatus.

These objects are attained, in accordance with the present invention, by providing for the carriers a closed track circuit in a vertical plane which includes a substantially continuous track for each pair of wheels of the carriers, and interconnected conveyors positively controlling the movement of each carrier throughout the track circuit.

Other objects and advantages of the invention are hereinafter described in connection with a detailed description of a practical apparatus embodying the invention and shown in the accompanying drawings, in which:—

Fig. 1 is a diagrammatic plan view of a fragment of the track circuit for the carriers;

Fig. 2 is a diagrammatic side elevation of the entire track circuit, indicating different positions taken by a carrier in passing around the circuit;

Figs. 10, 11, 12 and 13 (on Sheet 1) are face views of portions of the tracks, looking in the directions of the arrows 10, 11, 12 and 13 in Fig. 2. Figs. 11, 12 and 13 show parts sectioned on the line 11—11 of Fig. 9 and the lines 12—12 and 13—13 of Fig. 8, respectively.

The apparatus illustrated includes a large number of collapsible carriers 10, each provided with a plurality of carrying elements 20, and means for moving these carriers in a closed circuit which takes each carrying element past a loading station L, through a treatment space T, to a dumping station D, and back to the loading station L.

Figure 3:
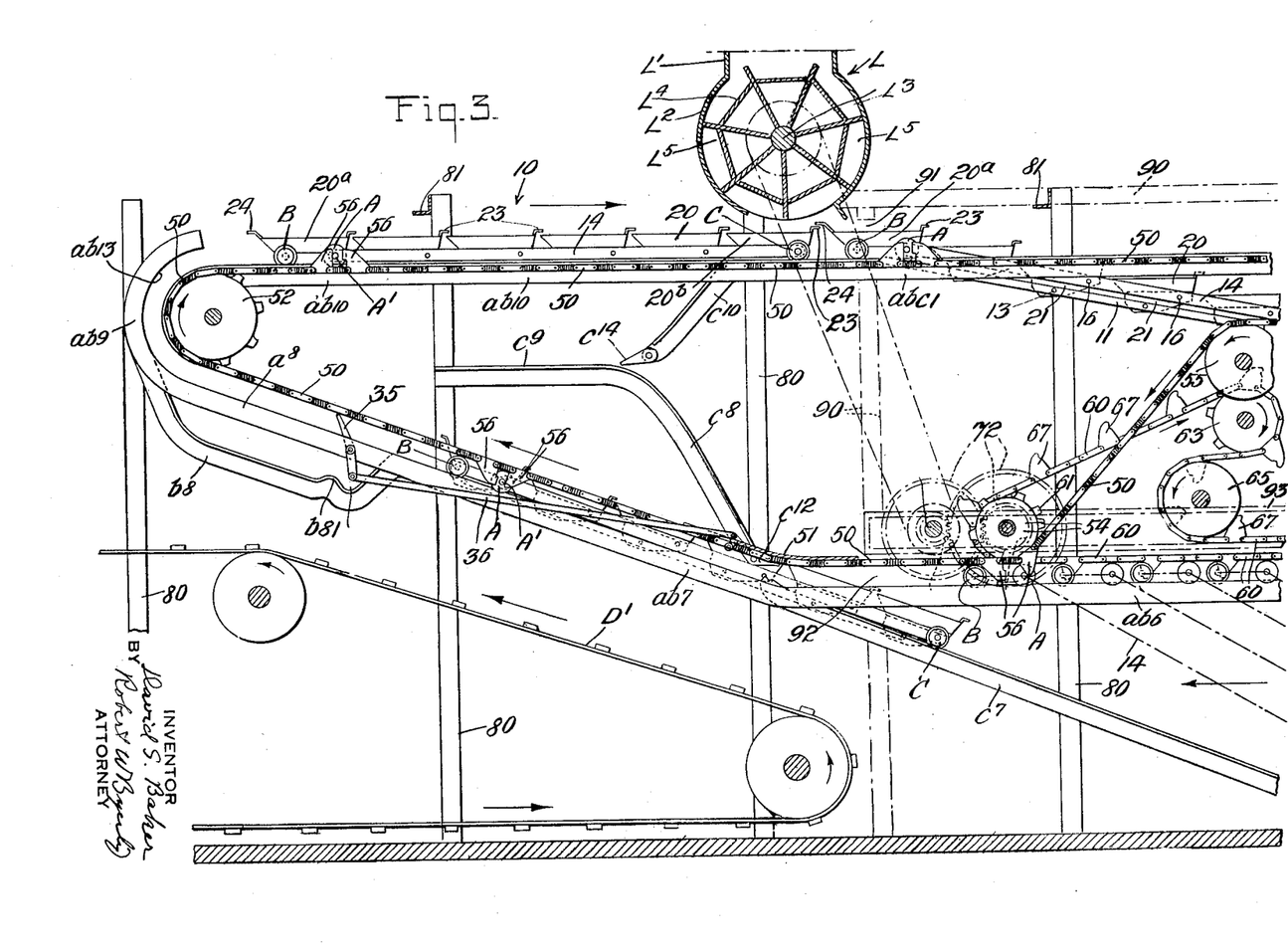
Figs. 3, 4 and 5 are side elevations of the front, middle and rear parts of the entire apparatus, Figs. 3 and 4 overlapping to some extent.
Figure 6:
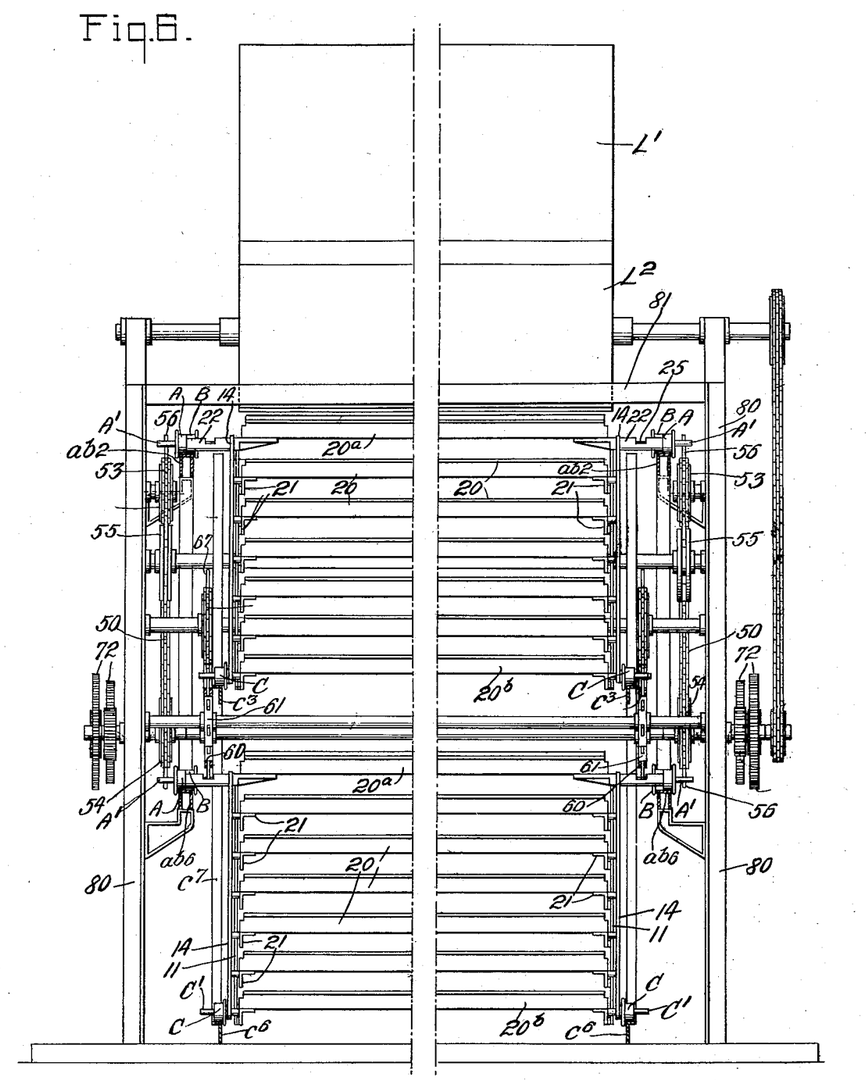
Fig. 6 is a sectional elevation taken on the line 6—6 of Fig. 4, looking in the direction of the arrows.
Figure 7:
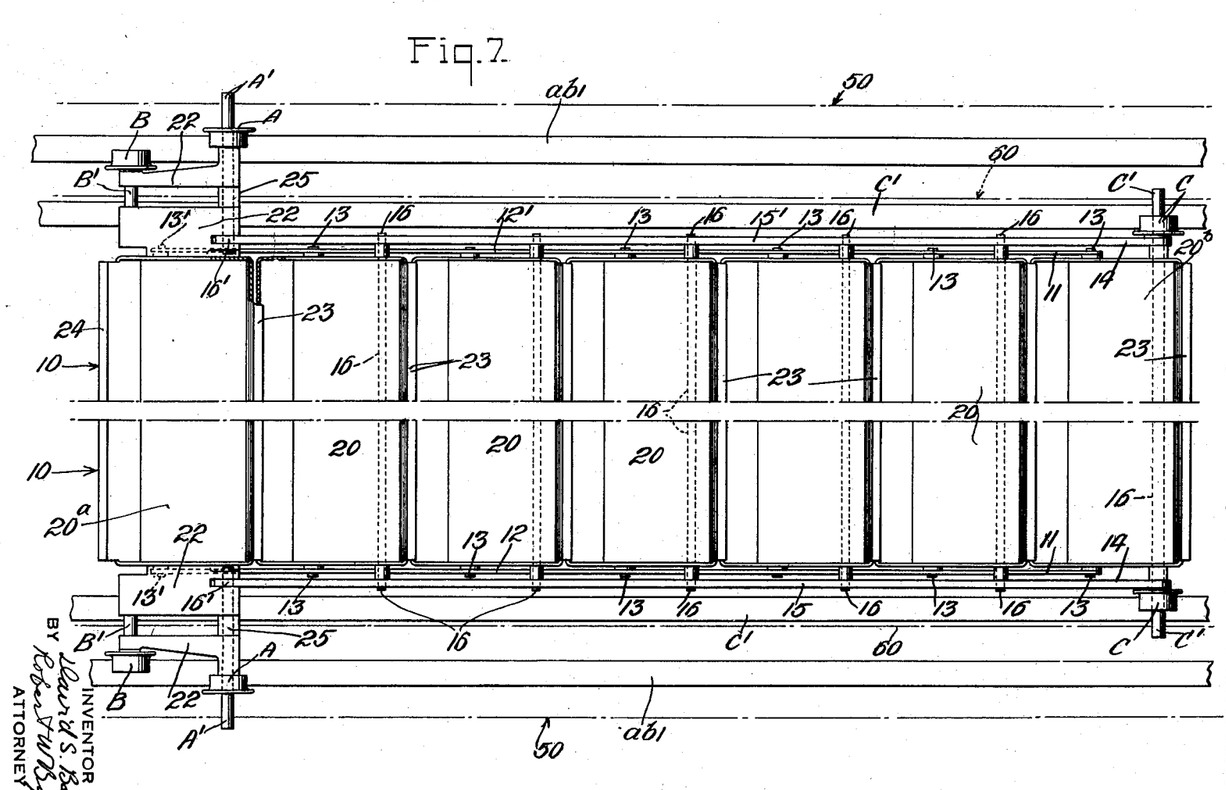
Fig. 7 is a plan view on a larger scale showing a carrier in loading position.

The carriers 10, like those shown in Baker Patent No. 1,672,404, consist essentially of carrying elements and connecting members hinged together in parallelogram arrangement. The construction of a carrier 10 is best shown in Figs. 6 and 7. The carrier has a connecting member 11 consisting of rigid side bars 12, 12', joined by tie rods 13, and a connecting member 14 consisting of side bars 15, 15', joined by tie rods 16. A number of carrying elements or trays 20 are hinged to the connecting members 11, 14. Each tray, except the upper one 20a, has on its bottom two spaced cross bars 21 which are pivoted on the tie rods 13, 16 of the connecting members. The upper tray has side-pieces 22 rigidly secured to it, and hinged to the upper ends of the side bars 12, 12' of the connecting member 11 by pivots 13', and to the upper ends of the side bars 15, 15' of the connecting member 14 by pivot rods 16'. The distance between the adjacent pivots of each connecting member is equal to the length $l$ of one of the trays 20, so that the trays may be brought into edge-to-edge relation in a common plane by bringing the connecting members together. Each tray is provided at one edge with a lip 23 which overlaps the adjacent edge of the next tray when the trays are in edge-to-edge relation. The upper tray has a lip 24 at its other edge to overlap the lip 23 of the lowest tray 20b at the loading station (Fig. 3).

Each carrier is provided with three pairs of wheels A, B and C. The wheels A are co-axial with the hinge pivots 16' which connect one of the carrying elements, 20a, and one of the connecting members 14. The wheels B are secured on this carrying element 20a at a distance from the wheels A, and the wheels C are mounted on this connecting member 14 at a distance from the wheels A. The wheels C may be mounted on the lowest of the tie rods 16 as shown. The wheels B may be co-axial with the pivots 13' but, because of the provision of the rigid side-pieces 22 on the upper tray 20a, may be placed further from the axis of the wheels A, as shown, to give greater stability to the carrier.

To provide for engagement of the carriers by the flights of chain conveyors, the wheels A have projecting axles A' extending over the chains of a wide-gauge conveyor 50, indicated by dot and dash lines in Fig. 7 and hereinafter described; and the wheels C have projecting axles C' extending over the chains of a narrow-gauge conveyor 60, indicated by dot and dash lines in Fig. 7 and hereinafter described. The side-pieces 22 are cut away to expose the axles B' of the wheels B to the flights of the conveyor 60 and contain grooves 25 to permit the flights to reach these axles without interference.

The relative position of the pairs of wheels A, B and C determines the position of the trays 20 and their relation to each other. The pairs of wheels A, B and C are of three different gauges, and tracks $a$, $b$ and $c$ of different guages are provided for supporting and guiding them. Of these tracks, $a$ has the widest gauge, $c$ the narrowest, while $b$ is intermediate between $a$ and $c$.

The arrangements of the tracks $a$, $b$ and $c$ is an important feature of the present invention, being a great advance in the direction of simplification over any means heretofore proposed for guiding parallelogram carriers, such as those described, in a closed vertical circuit. According to the present invention, a complete closed circuit of track is provided for each one of the three pairs of wheels, and these three track circuits are so interrelated in position that, as each pair of wheels passes around its own circuit, the carrier moves in a closed circuit and is placed successively in loading position with its trays in edge-to-edge relation in a common horizontal plane, in treating position with its trays horizontal and in stepped or other superimposed relation, and in dumping position with its trays vertical or inverted. In this circuit, each one of the pairs of wheels of the carrier is supported throughout on a track which is continuous except for the interposition of a few small automatic switches.

Figures 1, 2, 10, 11, 12, 13:
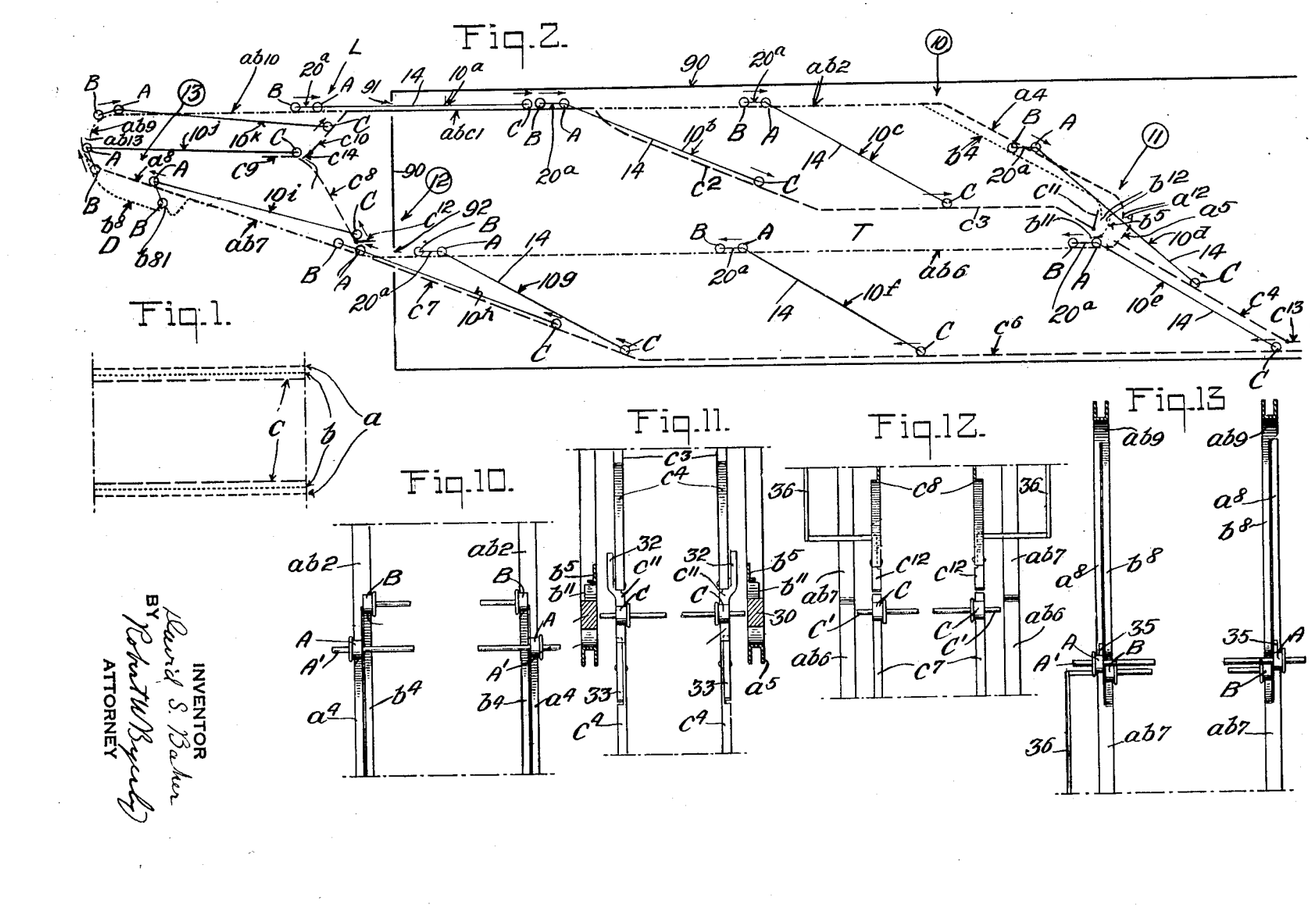

The arrangement of the three track circuits may best be understood from the diagrammatic views, Figs. 1 and 2. Fig. 1 is a fragmentary plan view, serving merely to indicate the different gauges of the three tracks $a$, $b$ and $c$, and to show the three different kinds of lines by which these tracks may be identified in the side elevation, Fig. 2. From Fig. 1, it will be noted that the widest track $a$ is indicated by a short dash line, the intermediate track $b$ by a dotted line, and the narrowest track $c$ by a long dash line. The three tracks are indicated by the same three types of lines in Fig. 2, except that, where tracks $a$ and $b$ lie in the same plane, a dot and dash line is used to indicate them, while, where all three tracks lie in the same plane, a continuous line is used.

Referring to Fig. 2, it will be seen that, at the loading station L, all three tracks are horizontal and in the same plane, represented by the line $abc1$. Beyond the loading station, the tracks $a$ and $b$ have coplanar horizontal portions $ab2$ extending into the upper portion of the treatment space, while the track $c$ has a downwardly inclined portion $c2$ at the entrance to the treatment space and a horizontal portion $c3$ below the level of the portion $ab2$ of the tracks $a$ and $b$, and separated from this portion of the tracks $a$ and $b$ by a vertical distance less than the length of a connecting member of one of the carriers. At the end of the treatment space, the tracks $a$, $b$ and $c$ have parallel downwardly inclined portions $a4$, $b4$ and $c4$. The inclined portions $a4$, $b4$ of the tracks $a$ and $b$ are separated by a horizontal distance equal to that between the axes of the wheels A and B. At the lower ends of these inclines $a4$, $b4$, the tracks $a$ and $b$ have inwardly curved portions $a5$, $b5$ extending into coplanar horizontal portions $ab6$ in the lower part of the treatment space. At the lower end of its incline $c4$, the track $c$ also has a horizontal portion $c6$ extending through the lower part of the treatment space and located at the same distance below the portion $ab6$ of the tracks $a$, $b$, as it was in the upper part of the treatment space. At the dumping station D, the tracks $a$, $b$ have upwardly inclined coplanar portions $ab7$, beyond which the track $a$ has a continuing upwardly inclined portion $a8$, while the track $b$ has a portion $b8$ below the track $a$. Beyond the portions $a8$, $b8$, the tracks $a$, $b$ have curved portions $ab9$ which bring the tracks to their original level at the loading station, and coplanar horizontal portions $ab10$ which run into their coplanar horizontal portions at the loading station, represented by the line $abc1$ first mentioned. On approaching the dumping station, the track $c$ has an upwardly inclined portion $c7$, bringing it to the level of the portion $ab6$ of the tracks $a$ and $b$. The portion $c7$ of the track $c$ lies in the same inclined plane as the portion $ab7$ of the tracks $a$ and $b$. The track $c$ then crosses the tracks $a$ and $b$, having a more steeply inclined portion $c8$ curving into a horizontal portion $c9$, and an oppositely inclined portion $c10$ bringing it up to join the portion of the track $c$ at the loading station which is on the level with the tracks $a$ and $b$ and is represented by the line $abc1$ before mentioned.

Automatic switches $c11$, $c12$ are provided in the tracks $c$ at the two points at which it crosses the tracks $a$ and $b$. The track $c$ also has automatic switches $c13$, $c14$ at the two points at which it doubles back on itself in a switch-back arrangement. An automatic switch $b11$ is provided in the track $b$ at the point at which its curved portion $b5$ rejoins the coplanar portions $ab6$ of the tracks $a$ and $b$ in the lower part of the treatment space. At the points where the tracks $a$ and $b$ extend vertically, they are provided for a short distance with double portions $a12$, $b12$, $ab13$ to engage both sides of the pairs of wheels A and B. Except for these short breaks, each track is continuous throughout its closed circuit.

The positions which each carrier assumes in traveling around the circuit are indicated in Fig. 2 by reference characters $10a$, $10b$, etc. The diagrammatic indication of the carrier shows merely the position of its wheels A, B and C, of its upper tray $20a$, and of its connecting member 14. It will be understood from the description of the carrier previously given, that all the trays of the carrier are at all times parallel to its upper tray $20a$, and that its other connecting member 11 is at all times parallel to its connecting member 14.

In the loading position indicated at $10a$, the three pairs of wheels of the carrier are supported on the same level, so that the trays of the carriers are in edge-to-edge relation in a common plane. As the carrier proceeds to the right and enters the treatment space, its wheels C run down the incline $c2$ as shown at $10b$, so that, when the carrier has entered the treatment space as shown at $10c$, its connecting bars are inclined and its trays are horizontal and are super-imposed in stepped relation. At the end of the treatment space, the three pairs of wheels of the carrier descend along their separate inclines $a4$, $b4$, $c4$ without any material change in the inclination of the connecting members or the relative position of the trays, as shown at $10d$, so that the trays retain all their material on the incline. The wheels C pass across the intersection of the track c with the tracks a, b before the wheels A and B reach this intersection, so that the switch c11 at this point may be automatically closed for the wheels C and then opened for the passage of the side-pieces 22 on which the wheels A and B are mounted. At the lower end of the inclines a4, b4, the wheels A and B pass around the curves a5, b5 onto the level portion ab6 of the tracks a and b in the lower part of the treatment space, while the wheels C reach the level portion c6 of the track c by a closing and opening of the automatic switch c13. After the wheels B have passed over the switch b11 in the track b, where this track rejoins the plane of the track a, this switch automatically opens to permit the passage of the axles of the wheels A. The carrier is then in the position 10e in the lower portion of the treatment space with its trays in stepped relation. As the three pairs of wheels of the carrier move to the left along their three tracks in the lower part of the treatment space as shown at 10f, the relative position of the trays is unchanged until the wheels C reach the incline c7 and move upward, bringing the trays towards a coplanar position as shown at 10g. When the wheels A and B reach the incline ab7, the trays are tipped into coplanar relation at a slight angle to the horizontal as shown at 10h, but they are not tipped sufficiently to disturb the material which they are carrying. As the wheels A and B continue up the incline ab7, the wheels C mount the incline c7, crossing the switch c12, and reaching the steeper incline c8 at about the same time that the wheels B reach the beginning of the portion b8 of the track b and drop down below the wheels A to bring the trays into vertical position as shown at 10i. The wheels B pass over a bump b8' which jars the trays and secures a complete emptying of them. In the movement which has just been described, the wheels A and B pass through the point of intersection of the tracks a and b with the track c before the wheels C reach this point of intersection, so that the automatic switch c12 may open for the passage of the side-pieces 22 and close for the passage of the wheels C. After the dumping, the wheels A proceed up the incline a8, while the wheels B follow along the portion b8 of the track b, so that the wheels B return to the point at which the tracks a and b come coplanar behind the wheels A; while, at the same time, the wheels C pass through the switch-back c14 in the track c, reversing their direction of motion, and bringing them up the incline c10 to the level of the coplanar horizontal portions abc1 of the track in advance of the wheels A and B, so that the carrier is again brought into loading position (see 10j and 10k).

It should be noted that, as the carrier passes around the track circuit, its wheels A precede its wheels B in the upper part of the circuit, and that its wheels B precede its wheels A in the lower part of the circuit. The horizontally separated inclined and curved portions a4, b4, a5, b5 of the tracks a and b cause one reversal of the relative position of the wheels A and B, while vertically separated portions a8, b8 cause another reversal of their relative positions. It should also be noted that the wheels C precede the wheels A and B in the upper part of the circuit and follow the wheels A and B in the lower part of the circuit. Two reversals in the direction of movement of the wheels C occur, one at the switch-back c13 located at the convex side of the curved portions a5, b5 of the tracks a and b, and the other at the switch-back c14 located at the concave side of the curved portion ab9 of the tracks a and b.

Figure 9:
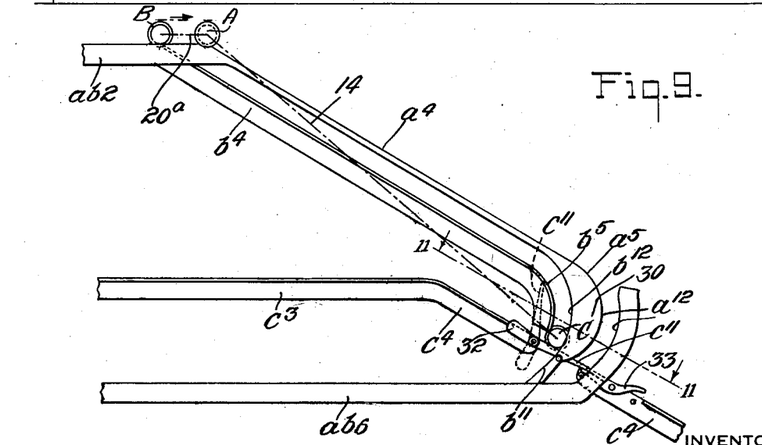
Fig. 9 is a side elevation of the rear end of the apparatus, omitting the conveyors.

While the three tracks a, b and c may be made physically separate throughout, I have in the drawings shown a simple structural arrangement in which a single pair of wide rails is provided to form the tracks a and b in the portions of the circuit where these tracks are coplanar. I have also shown in Figs. 9 and 11, crescent-shaped members 30 whose inner surfaces form the outer side of the curved portion b5 of the track b and whose outer surfaces form the inner side of the curved portion a5 of the track a. Elsewhere, I have shown the rails of the three tracks physically separate.

Figure 8:
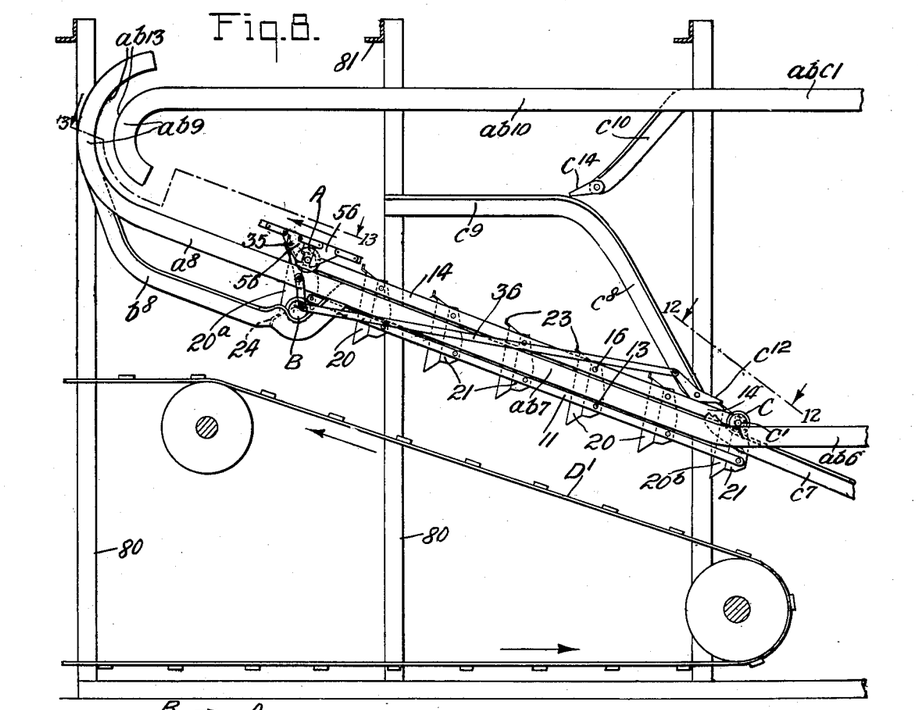
Fig. 8 is a side elevation of the front end of the apparatus, omitting the conveyors, and showing a carrier in dumping position.

The automatic switches, which have been referred to, may have any convenient form. In the drawings, I have shown a practical physical embodiment of each switch. The switch b11 (Fig. 9) consists of arms pivoted to the lower end of the crescent-shaped members 30 and normally resting on the rails of the horizontal portion ab6 of the tracks a, b. The switch c11 (Figs. 9 and 11) consists of levers pivoted to the rails of the tracks c just above the break in the track and provided with counterweights 32 to hold them in open position. Tappet levers 33 are pivoted to the rails of the track c just below the break to enable the wheels C to throw open the switch c11 after they have passed over it. The switch c12 (Figs. 3, 8, 12 and 13) consists of levers pivoted on the lower end of the rails of the portion c8 of the track c. This switch is normally open, but is automatically closed for the wheels C when the wheels A encounter tappet levers 35 pivoted to the rails of the portion a8 of the track a and connected to the switch c12 by rods 36. The switch c13 (Fig. 5) consists of levers pivoted to the lower ends of the rails of the inclined portion c4 of the track c and provided with counterweights 34 to hold them normally in open position. The switch c14 (Fig. 8) consists of arms pivoted to the lower ends of the rails of the inclined portion c10 of the track c.

Automatic movement of the carriers 10 along the tracks is secured by interconnected conveyors operating in timed relation. The track arrangement which has been described, and particularly the provision of continuous track circuits of each pair of wheels and the fact that at least one of the tracks has no sharp angles in its circuit, permits the use of a very simple conveyor arrangement. Only three conveyors are used, of which two, 40, 50, operate at relatively high speed for transferring the carriers between the upper and lower levels, while the third, 60, operates at relatively low speed to move the carriers in both directions along the horizontal parts of the circuit. Each conveyor consists of two chains having reaches lying close to a portion of one of the tracks and provided with flights for engaging a part of each carrier 10. The chains of the conveyor 60 are closer together than those of the conveyors 40, 50. To facilitate the reading of Figs. 3, 4 and 5 of the drawings, the conveyors 40 and 50 have alternate links shaded to distinguish them from the conveyor 60.

The conveyor 40 transfers the carriers from the upper tracks to the lower tracks at the right-hand end of the treatment space. The chains of this conveyor follow the course of the track a at the right-hand end of its horizontal portion $ab2$, at its inclined portion $a4$, and at its curved portion $a5$; and, for this purpose, pass over sprockets 41 located at the juncture of the portion $ab2$ and $a4$ of the track, sprockets 42 co-axial with the curved portion $a5$ of the track, and sprockets 43, 44, 45 and grooved pulleys 46 and 47. The chains are provided with double flights 48 to engage the projecting axles A' of the wheels A of each carrier.

The conveyor 50 transfers the carriers from the lower tracks to the upper tracks at the left-hand end of the apparatus, and moves them past the loading station. The chains of this conveyor follow the course of the track $a$ at the left-hand end of the horizontal portion $ab6$, at the inclined portion $ab7$, $a8$, at the curved portion $ab9$, at the horizontal portion $ab10$, $abc1$, and at the left-hand end of the horizontal portion $ab2$. They pass around a guide plate 51 at the juncture of the portion $ab6$ and the inclined portion $ab7$, and over sprockets 52 concentric with the curved portion $ab9$, and also around sprockets 53, 54 and grooved pulleys 55. They are provided with double flights 56 to engage the projecting axles A'.

The slow-moving conveyor 60 moves the carriers to the right in the upper part of the treatment space and to the left in the lower part. Its chains, which are closer together than the chains of the conveyors 40 and 50, have upper reaches following the course of the horizontal portion $c3$ of the track $c$ and lower reaches following the course of the horizontal portion $ab6$ of the tracks $a$ and $b$. They pass around sprockets 61, co-axial with the sprockets 54, sprockets 62, co-axial with the sprockets 46, and over sprockets 63, 64 and grooved pulleys 65 and 66. They have flights 67 adapted to engage the projecting axles C' of the wheels C, and the axles B' of the wheels B inside these wheels. The sprockets 62 are so positioned that the flights of the conveyor 60 release the axles C' of a carrier just as its axles A' are engaged by the flights of the conveyor 40, and engage the axles B' of this carrier just as its axles A' are released by the flights of the conveyor 40. The sprockets 61 and 64 are so positioned that the flights of the conveyor 60 release the axles B' of a carrier just as the flights of the conveyor 50 engage its axles A', and engage the axles C' of a carrier just as its axles A' are released by the flights of the conveyor 50.

The speed of the conveyors is so related that the trays move past the loading station closely spaced in single file, and through the treatment space closely spaced in multiple file. In order that each carrier may be positively guided and timed throughout its circuit, and, for this purpose may always be in engagement with one or another of the conveyors, the flights of the different conveyors are spaced apart by distances proportional to the rates of movement of the conveyors. Thus taking the length $l$ of a tray as the linear unit and the number of trays in each carrier as $n$, the rate of movement of the conveyor 50, which moves the carriers past the loading station, is substantially $n$ linear units per unit of time, and its flights are substantially $n$ linear units apart; the rate of movement of the treatment conveyor 60 is one linear unit per unit of time, and the flights of this conveyor are spaced one linear unit apart; while the rate of movement of the lowering conveyor 40 is greater than $n$ linear units per unit of time. In the form shown, the number of trays of each carrier is seven. The spacing of the flights of the conveyor 50 and the rate of movement of this conveyor is slightly greater than $7l$, since the provision of the lips 24 on the upper trays of the carriers makes the length of the carriers in loading position slightly greater than $7l$ (see Fig. 3). The extra space thus provided between the wheels C of one carrier and the wheels B of the following carrier, when both carriers are being moved by the conveyor 50, has the advantage of giving ample time for the opening of the switch $c12$ after the wheels C of the first carrier have passed over it before the side-pieces 22 of the next carrier reach it. The spacing of the flights of the conveyor 40 and its rate of movement is $9l$ which permits one flight of this carrier to complete the lowering movement of one carrier before its next flight starts the lowering movement of the following carrier.

Various forms of known mechanism may be used to operate the conveyors at the relative rates specified. In the form shown, the sprockets 44 of the conveyor 40 are driven directly from an electric motor 70. The sprockets 62 of the conveyor 60 are driven from the shaft of the sprockets 44 through reducing gearing 71. The conveyor 50 is driven by the conveyor 60 through speed-increasing mechanism 72 connecting the sprockets 61 with the sprockets 54.

Figure 4:
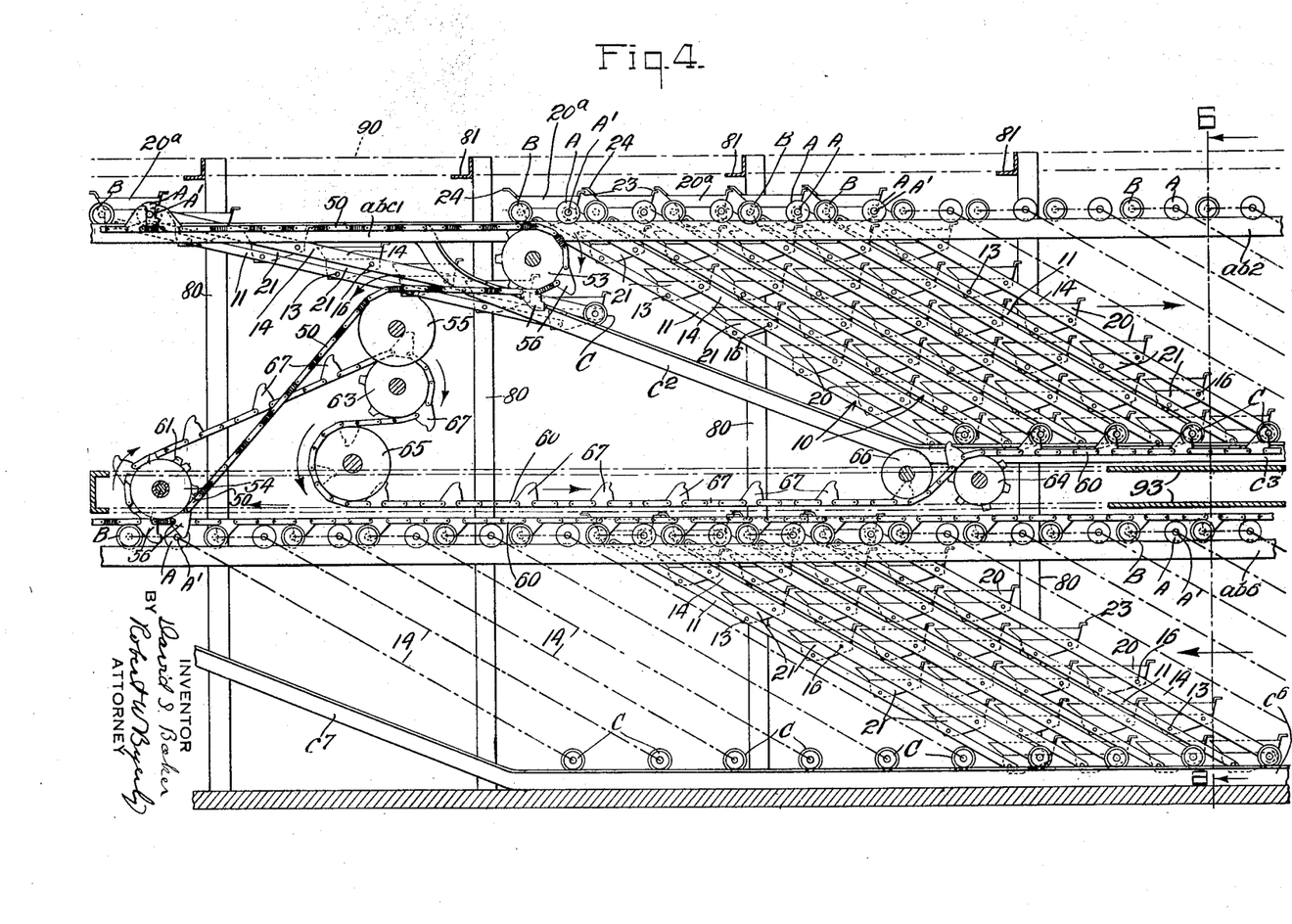

Various means for supporting the tracks and working parts of the apparatus can readily be arranged by any competent builder, and the particular form of such supporting means is not a vital feature of the present invention. A practical means for supporting the tracks and working parts is, however, indicated in Figs. 3, 4, 5 and 6. A supporting frame shown consists of vertical side frames 80 which may be stiffened by cross-pieces 81, positioned so as not to interfere with the movement of the carriers. The tracks $a$, $b$ and $c$ may be supported from the frames wherever desired by any suitable brackets, and track portion $c6$ may be placed on the floor, as shown in Figs. 4 and 6. The shafts for the various sprockets for the driving chains and conveyor chains may extend between the side frames and be journalled thereon.

The apparatus which should be used for loading the trays at the loading station L depends upon the nature of the material to be treated. If this material is of a non-viscous nature, the loading apparatus may include a chute L1, the lower end of which is enlarged to form a cylindrical casing L2 for a revolving measuring wheel L3. Wheel L3 is shown as having axial vanes extending radially from the center of the wheel to the inner face of the casing, and having plates L4 mounted between the vanes and parallel to chords of the casing to form pockets L5 for the material. The material drops from pockets L5 upon the trays 20 through an opening in the bottom of casing L2, and the pockets have the same volume as the trays, so that the discharge from each pocket fills a tray. The wheel L3 may be driven by a shaft of the speed-increasing mechanism 72, as shown.

The apparatus for receiving the material from trays 20 as they discharge at the dumping station D may consist of a belt conveyor D1.

Figure 5:
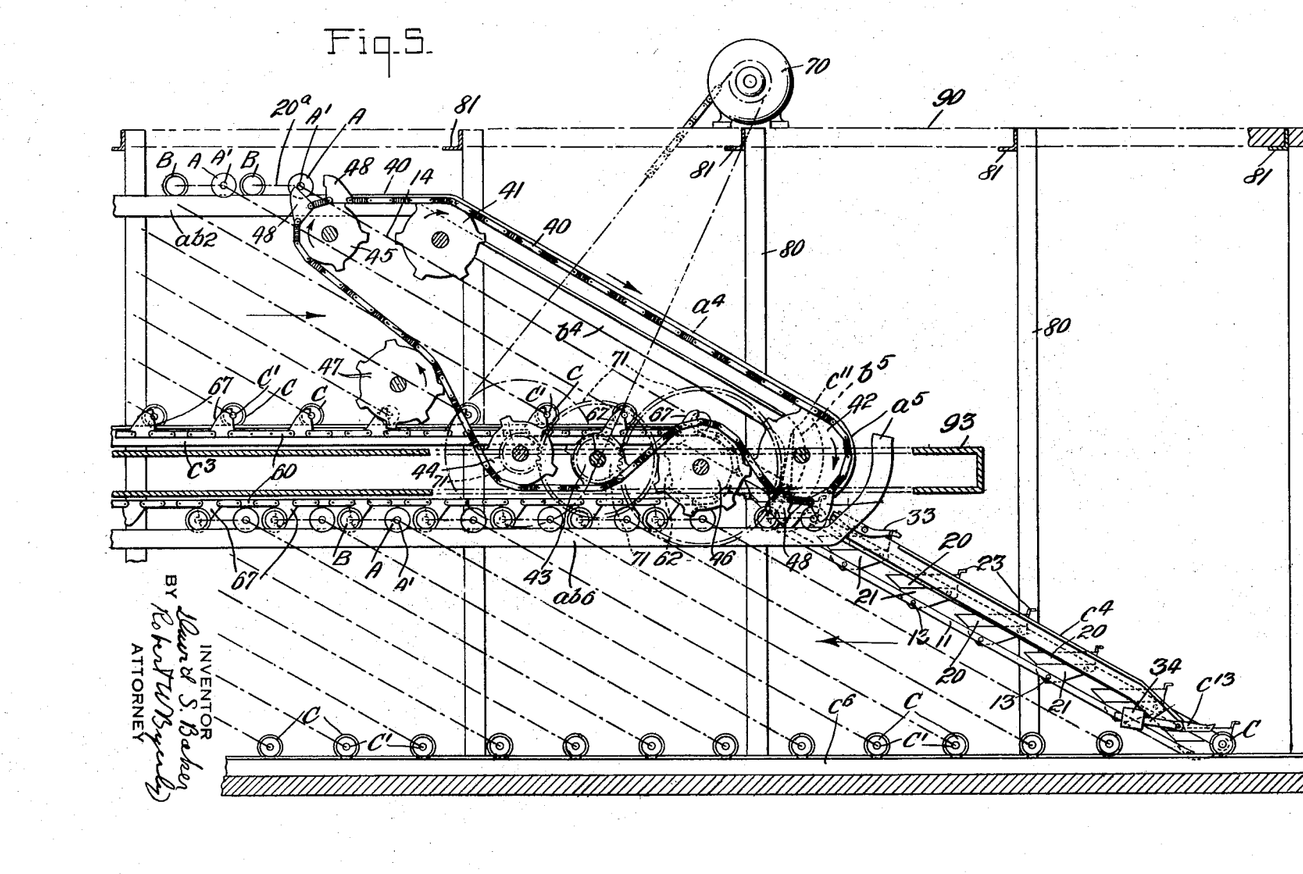

For certain treatments of the material, such as drying, it is desirable to have the treatment space enclosed. An enclosure 90 for the treatment space T is indicated on Figs. 2, 3, 4 and 5. An entrance opening is indicated at 91 for admitting carriers 10 into the enclosure 90, and an exit opening is indicated at 92 through which the carriers may leave the enclosure 90. It is desirable that the openings in the enclosure 90 be of small proportions and, therefore, the walls of the enclosure 90 are so arranged that the openings 91 and 92 will fall at points in the path of the carriers where the trays are edge-to-edge. The entrance opening 91 embraces track portion $abc1$, and the exit opening 92 embraces the tracks $a$, $b$ and $c$ near the junction between the portions $ab6$, $ab7$ of the tracks $a$ and $b$ and the portions $c7$, $c8$ of the track $c$. If desired, the treatment chamber may be divided horizontally by a partition 93 (Figs. 3, 4, 5).

In use of the apparatus which has been described, the number of carriers 10 is equal to the number of flights on the active reaches of the conveyors. Each carrier is moved completely around the track circuit by the conveyors; and, by the relative position of the tracks in different parts of the circuit, its carrying elements are placing successively in edge-to-edge loading position, superimposed or stepped treating position, and vertical or inverted dumping position. The carriers are closely spaced side-by-side in both the upper and lower parts of the treatment space, so that their trays form continuous superimposed slowly traveling platforms in the treatment space, and the carriers are closely spaced end-to-end in the loading station, so that their trays form a continuous rapidly traveling platform at this point.

What I claim is:

1. The combination with a collapsible multiple carrier having a plurality of carrying elements and pairs of wheels of different gauges whose relative position controls the position and relation of its carrying elements, of a closed track circuit in a vertical plane comprising substantially continuous tracks of different gauges for the wheels of the carrier, differently spaced from one another about said circuit so as to cause the carrying elements of the carrier to assume an edge-to-edge loading position, a superimposed treatment position and a dumping position as it passes around the circuit.

2. The combination with a carrier having a plurality of carrying elements and connecting members hinged together in parallelogram arrangement and three pairs of wheels of different gauges whose relative position controls the position and relation of its carrying elements, of a closed track circuit in a vertical plane comprising three substantially continuous tracks of different gauges, differently spaced from one another about said circuit so as to cause the carrying elements of the carrier to assume successively an edge-to-edge loading position, a superimposed treatment position and a dumping position as the carrier is moved around the circuit.

3. The combination with a collapsible carrier having a plurality of pairs of wheels, of a closed track circuit in a vertical plane including a substantially continuous track for each pair of wheels of the carrier, and a plurality of interconnected conveyors for moving the carrier completely around the circuit.

4. The combination with a carrier having pairs of wheels at its ends, of a closed track circuit in a vertical plane comprising substantially continuous loops of track for the pairs of wheels of the conveyor, one loop of track lying partly within and partly outside the other loop of track, and being provided with switches at the points at which it crosses the other loop of track.

5. The combination with a carrier having pairs of wheels of different gauges at its ends, of a closed track circuit in a vertical plane comprising a closed loop of track for the wheels of the wider gauge, a closed loop of track for the wheels of the narrower gauge lying partly within and partly without said wide-gauge loop, and switches in said narrow-gauge loop at the points at which it crosses said wide-gauge loop.

6. The combination with a carrier having pairs of wheels of different gauges at its ends, of a closed track circuit in a vertical plane comprising a closed loop of track for the wheels of the wider gauge, a closed loop of track for the wheels of the narrower gauge lying partly within and partly without said wide-gauge loop, and switches in said narrow-gauge loop at the points at which it crosses said wide-gauge loop, said loops being differently spaced from one another about said circuit so that the ends of the carrier are moved in a common path in part of the circuit and in spaced paths at another part thereof.

7. The combination with a carrier provided with wheels, of a closed track circuit lying in a vertical plane and including two horizontal tracks, two inclined tracks, and curved overlapping tracks connecting each inclined track to the horizontal track with which it makes an acute angle.

8. The combination with a carrier provided with wheels, of a closed track circuit lying in a vertical plane and including two horizontal tracks, two inclined tracks, and a circularly curved track connecting each inclined track to the horizontal track with which it makes an acute angle, sprockets concentric with said curved tracks, and conveyors passing over said sprockets and adapted to move the carrier around said circuit.

9. The combination with a carrier having two pairs of wheels of different gauges, of a closed track circuit in a vertical plane, comprising two substantially continuous loops of track for the two pairs of wheels having coplanar portions and, at two points of the circuit, portions separated by a distance equal to that between the two pairs of wheels to cause two reversals in the relation of the pairs of wheels, as the carrier passes around the track circuit.

10. The combination with a carrier having two pairs of wheels of different gauges, of a closed track circuit for one of said pairs of wheels having upper and lower horizontal portions and inclined connecting portions, and a closed track circuit for the other pair of wheels which includes an inclined connecting portion horizontally spaced from one of the inclined connecting portions of the first track circuit to cause a reversal of the relative position of said pairs of wheels and a portion extending below a portion of the first track to cause another reversal of the relative position of said pairs of wheels and is at all other points coplanar with the first track.

11. The combination with a carrier having a pair of wheels at one of its ends, of means for moving and guiding the other end of the carrier in a closed path lying in a vertical plane and having upper and lower horizontal portions and curved end portions, and a track circuit for said pair of wheels including a switch-back at the convex side of one of the curved end portions of said path and a switch-back at the concave side of the other of the curved end portions of said path.

12. The combination with a carrier having two pairs of wheels of different gauges, of a track for each pair of wheels consisting of an upper part, a lower part and an inclined part, the upper and lower parts of the two tracks being coplanar, and the inclined parts of the two tracks being spaced apart by a horizontal distance equal to the distance between the two pairs of wheels.

13. The combination with a number of independent carriers each having two pairs of wheels of different gauges, of coplanar upper and lower tracks for each pair of wheels and horizontally spaced inclined tracks for the two pairs of wheels, and a conveyor adapted successively to engage carriers on one of the horizontal tracks and to move each carrier along the inclined tracks to the other horizontal track.

14. The combination with a carrier having two pairs of wheels of different gauges, of coplanar upper and coplanar lower horizontal tracks for the two pairs of wheels, and horizontally spaced inclined connecting tracks for the two pairs of wheels, each having a curved portion connecting it with the horizontal track with which it makes an acute angle.

15. The combination with a carrier having two pairs of wheels of different gauges, of coplanar upper and coplanar lower horizontal tracks for the two pairs of wheels, an inclined connecting track for the wheels of the wider gauge having a curved portion joining it with the horizontal track with which it makes an acute angle, an inclined connecting track for the wheels of the narrower gauge spaced horizontally inward from the first connecting track and having a curved portion, and a switch connecting it with the horizontal track with which it makes an acute angle.

16. The combination with a plurality of independent carriers each having two pairs of wheels of different gauges, of coplanar upper and lower horizontal tracks for the two pairs of wheels and horizontally spaced inclined connecting tracks for the two pairs of wheels, each having a curved portion connecting it with the horizontal track with which it makes an acute angle, a sprocket wheel concentric with one of said curved portions, and a chain conveyor passing over said sprocket and having flights adapted to engage the carriers successively and to move each of them from one of the horizontal tracks to the other horizontal track.

17. The combination with a carrier having a plurality of carrying elements and connecting members hinged together in parallelogram arrangement and provided with two upper pairs of wheels of different gauges and a lower pair of wheels, of a track for each upper pair of wheels consisting of an upper part, a lower part and an inclined part, the upper and lower parts of the tracks being coplanar and the inclined parts being spaced apart by a horizontal distance equal to the distance between the two upper pairs of wheels, and a track for the lower pair of wheels consisting of an upper part, a lower part and an inclined part, each located below the corresponding parts of the tracks for the upper wheels.

18. The combination with a carrier having a plurality of carrying elements and connecting members hinged together in parallelogram arrangement and provided with two upper pairs of wheels of different gauges and a lower pair of wheels, of coplanar upper and lower tracks for the two upper pairs of wheels, horizontally spaced inclined connecting tracks for the two upper pairs of wheels, each having a curved portion connecting it with the horizontal track with which it makes an acute angle, a track for the lower pair of wheels consisting of upper and lower horizontal parts and an inclined part, and a switch connecting said inclined part with the horizontal part with which it makes an acute angle.

19. The combination with a carrier having a plurality of parallel hinged carrying elements and provided with upper and lower pairs of wheels for controlling the relative position of its carrying elements, of upper and lower sets of tracks for said wheels so spaced as to maintain the carrying elements of the carrier in stepped relation, and inclined connecting tracks for said wheels positioned to keep the carrying elements in stepped position as the carrier moves between the upper and lower sets of tracks.

20. The combination with a carrier having upper and lower pairs of wheels, of a track for the upper wheels of the carrier having an upper horizontal part, a lower horizontal part, and an inclined connecting part, a track for the lower wheels of the carrier having an upper horizontal part located between the upper and lower horizontal parts of the first track, a lower horizontal part, and an inclined connecting part, and a switch in the track for the lower wheels at the point that it crosses the track for the upper wheels.

21. The combination with a carrier having a wide-gauge pair of wheels with flanges at their outer edges and a narrow-gauge pair of wheels with flanges at their inner edges, a pair of horizontal rails having upper surfaces of sufficient width to support both pairs of wheels, horizontal extensions from one end of said rails equal in length to the distance between said pairs of wheels and of a width to support the wide-gauge pair of wheels only, inclined rails for the wide-gauge wheels extending from the ends of said extensions, and parallel inclined rails for the narrow-gauge pair of wheels extending from the ends of the inner portions of said rails at the inner end of said extensions, to provide for moving said carrier horizontally and then downwardly in a horizontal position.

22. The combination with a carrier having wheels at one of its ends, of means for raising the other end of the carrier in a curved path, and a track for the wheels of the carrier consisting of two oppositely inclined parts connected by a switch-back at the concave side of said curved path.

23. The combination with a carrier having a plurality of carrying elements and connecting members hinged together in parallelogram arrangement and provided with two upper pairs of wheels and a lower pair of wheels, of a casing enclosing a treatment space and having entrance and exit openings, continuous track circuits in a vertical plane for the upper and lower wheels respectively, each circuit lying partly within and partly without said casing and passing through its entrance and exit openings, and said circuits being provided with coplanar upwardly inclined portions lying at opposite sides of the exit opening of the casing to position the carrying elements of the carrier in a common inclined plane as they pass through said exit opening.

24. The combination with a carrier having a plurality of carrying elements hinged to a plurality of connecting members in parallelogram arrangement and provided with two upper pairs of wheels, of a track for one pair of said wheels, a track for the other pair of said wheels including a portion extending below said first track to permit the descent of one pair of wheels to place the carrying elements in dumping position, and a projection to engage said pair of wheels and shake the carrying elements while in dumping position.

25. The combination with a plurality of multiple tray carriers having wheels at their upper and lower ends, of upper and lower sets of tracks for supporting said carriers in inclined position, a chain conveyor having flights and located between the upper and lower sets of tracks so that the flights on its upper reach engage the front lower corners of the carriers on the upper set of tracks and draw them in one direction while the flights on its lower reach engage the front upper corners of the carriers on the lower set of tracks and draw them in the opposite direction.

26. The combination with a plurality of carriers, of means for guiding said carriers in a closed circuit in a vertical plane, and a chain conveyor located between the upper and lower portions of the circuit to move the carriers in one direction in the upper portion of the circuit and in the opposite direction in the lower portion of the circuit.

27. The combination with a plurality of carriers having wheels, of a closed track circuit for said wheels including an upper horizontal track and a lower horizontal track, a conveyor between said horizontal tracks for moving the carriers in one direction on the upper track and in the other direction on the lower track, a second conveyor for moving the carriers from the lower track to the upper track, and a third conveyor for moving the carriers from the upper track to the lower track, said three conveyors being interconnected to operate in timed relation to each other.

28. A carrier having a plurality of carrying elements and two connecting members hinged together in parallelogram relation, a pair of wheels on the carrier coaxial with the hinge between one carrying element and one connecting member, a second pair of wheels on said connecting member, and a third pair of wheels on said carrying element located further from the first pair of wheels than the distance between the hinges connecting said carrying element to the two connecting members.

29. A carrier comprising a carrying element, side-pieces rigidly secured to said carrying element, two pairs of wheels mounted on said side-pieces, a connecting member hinged to the side-pieces on the axis of one of said pairs of wheels, a second connecting member hinged to the side-pieces between the axes of said two pairs of wheels, and a plurality of other carrying elements hinged to both said connecting members and parallel with said first carrying element.

DAVID S. BAKER.